(No Model.)
W. MURRAY.
BOTTLE.
No. 560,522. Patented May 19, 1896.
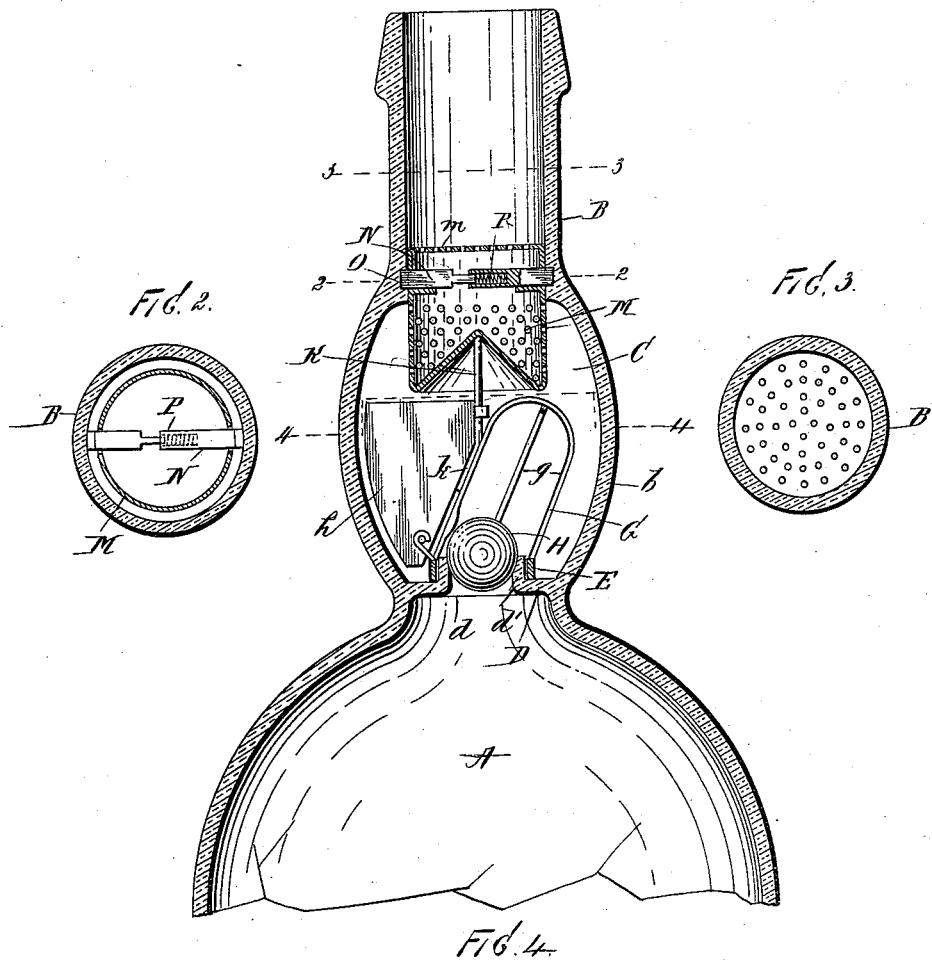
WITNESSES:
John Buckler,
C. Gerst
INVENTOR
William Murray,
BY Edgar Tate & Co
ATTORNEYS.

UNITED STATES PATENT OFFICE.

WILLIAM MURRAY, OF LAUREL HILL, NEW YORK, ASSIGNOR OF TWO-THIRDS TO JAMES A. JOHNSTON, OF BROOKLYN, AND JOSEPH KELLOW, JR., OF JAMAICA, NEW YORK.

BOTTLE.

SPECIFICATION forming part of Letters Patent No. 560,522, dated May 19, 1896.

Application filed October 21, 1895. Serial No. 566,446. (No model.)

*To all whom it may concern:*

Be it known that I, WILLIAM MURRAY, a citizen of the United States, and a resident of Laurel Hill, in the county of Queens and State of New York, have invented certain new and useful Improvements in Bottles, of which the following is a specification, reference being had to the accompanying drawings, forming a part thereof, in which similar letters of reference indicate corresponding parts.

This invention relates to bottles, jugs, jars, or similar vessels, and the object thereof is to provide a vessel of this class which having been once filled and emptied of its contents cannot be refilled or reused. This object I accomplish by means of a neck attachment provided with an automatic valve, the construction and arrangement of said attachment and the operation thereof being such that the valve will open to admit of the discharge of the contents of the bottle or vessel, but close and prevent the refilling thereof.

The invention is fully disclosed in the following specification, of which the accompanying drawings form a part, in which—

Figure 1 represents a central vertical section of the upper part of a bottle and the neck thereof provided with my improvement; Fig. 2, a section on the line 2 2 of Fig. 1; Fig. 3, a section on the line 3 3; and Fig. 4, a section on the line 4 4 thereof, the operative parts of the attachment being shown in full lines.

In the accompanying drawings I have shown my invention applied to a bottle, and in the practice of my invention I provide a bottle A, having a neck B, the lower part of which is enlarged, as shown at $b$, so as to form a chamber C, and at the bottom of the chamber C is a partition D, having a central opening $d$, around which is formed an upwardly-directed flange $d'$, on which is mounted a revoluble ring or band E, to which is secured a cage G, which projects upwardly and outwardly at an inclination to the flange $d'$, and the ring or band E and the cage G are adapted to revolve around said flange. The cage G is preferably composed of wire, as $g$, and placed therein is a ball-valve H, and secured to one side of the cage G is a counterbalance weight or plate $h$, said counterbalance-weight being rigidly secured to said cage and adapted to hold the same, so that the valve H will roll into the central opening through the partition $d$ in any position in which the bottle can be held except when inverted.

Secured to the side of the cage G, adjacent to the weight or plate $h$, is a vertical rod K, provided with a shank $k$, by which connection with the cage is made, and the weight or plate $h$ may all be secured to this rod K, and said weight or plate, instead of being rigidly connected with the cage and the rod K, may be hinged thereto or pivotally connected therewith in any desired manner.

Secured within the upper portion of the neck and extending downwardly into the chamber C is a tubular attachment M, the upper end of which is closed, as shown at $m$, and the lower end of which is conical in form, the apex thereof being directed inwardly, and the rod K, secured to the cage G, projects upwardly into the conical bottom of the tubular attachment M, and said conical bottom serves as a pivotal support therefor.

The side walls of the tubular attachment M and the top thereof are perforated, as shown, and said tubular attachment is secured in place by means of a cross-bar N, which passes therethrough and the ends of which project into an annular groove or recess O, formed in the inner walls of the neck just above the chamber C, and the cross-bar N is composed of two sections, one of which is provided with a central bore in its inner end, in which is placed a spring P, and the other of which is provided with a shank which projects into said central bore, and the operation of the spring is to force the separate sections of the cross-bar apart and the ends thereof into said annular groove or recess.

When the parts are constructed and placed in the position shown and described, the cage G will be free to revolve on the flange $d'$ of the partition-plate D, and in any position in which the bottle can be held, except when directly inverted, the weight $h$ will operate to hold the cage in such position that the valve H will roll downwardly through said cage into and close the port or opening $d$, as will be readily understood. In this class of devices the bottle must first be filled with the desired contents before the neck attachment is applied, and said attachment can be applied in any desired manner. One method of doing this consists in forming the neck in sections, and if this is done the neck may be divided crosswise of the chamber C and the separate sections united after the bottle has been filled and the neck attachment secured in place within the neck; but my invention is not limited to any means of accomplishing this result, and the same may be done in any desired manner. The bottle having been filled and the neck attachment applied the upper portion of the neck may be closed by a cork or stopper in the usual manner, and whenever it is desired to empty the bottle or discharge a portion of its contents it is only necessary to remove said cork or stopper and invert the bottle, when the contents thereof will flow out and around the valve H, which will leave its seat, and through the tubular attachment M, and this operation may be continued or repeated until the bottle is entirely empty. If an attempt be made to refill the bottle, the valve H will at once be reseated and no fluids can be poured into the bottle, and this operation of the valve will be the same in any position in which the bottle can be held in an attempt to pour liquids thereinto. This operation of the valve is caused by reason of the form of the cage G and the fact that it is revoluble on the flange $d'$, the weight $h$ always operating to hold said cage so that said valve will be seated unless the bottle is inverted. I may also construct the valve H so as to render the same a float-valve, in which event fluids cannot be forced into the bottle even when the latter is held in an inverted or vertical position, as the valve would rise and be seated and thus close the port or opening $d$.

It will thus be seen that I accomplish the object of my invention by means of an effective device and one which is comparatively inexpensive, and my invention is not limited to the exact form, construction, and arrangement of parts shown and described, and I therefore reserve the right to make all such alterations therein and modifications thereof as fairly come within the scope of the invention.

Having fully described my invention, I claim as new and desire to secure by Letters Patent—

1. A bottle, or similar vessel, provided with a neck, having a partition-plate at the bottom thereof, in which is formed a central opening, around which is formed an upwardly-directed annular flange, a cage the lower end of which surrounds said flange and is free to revolve thereon, said cage being held at an angle thereto, a weight secured to the inner inclined side of said cage, a ball-valve located therein, and a central vertical rod also secured to said cage, said rod being pivotally supported at its upper end, substantially as shown and described.

2. A bottle, or similar vessel, provided with a neck, having a partition-plate at the bottom thereof, in which is formed a central opening, around which is formed an upwardly-directed annular flange, a cage the lower end of which surrounds said flange and is free to revolve thereon, said cage being held at an angle thereto, a weight secured to the inner inclined side of said cage, a ball-valve located therein, and a central vertical rod also secured to said cage, said rod being pivotally supported at its upper end, and a tube secured in the neck, the lower end of which forms said pivotal support, and the upper end of which is closed, the side walls of said tube, and the upper end thereof, being also perforated, substantially as shown and described.

3. A bottle or other vessel provided with a partition-plate, at the bottom of the neck thereof, having a central port or opening around which is formed an upwardly-directed flange, a cage mounted on said partition-plate, the lower end of which surrounds said flange, and is free to revolve thereon, a ball-valve located in said cage, and adapted to close said port or opening, said cage being supported at an angle to said port or opening, and provided on its inner inclined side with a weight, which operates to hold the cage so that the valve will roll to the bottom thereof, when the bottle is tilted or held sidewise, substantially as shown and described.

4. A bottle or other vessel provided with a partition-plate, at the bottom of the neck thereof, having a central port or opening around which is formed an upwardly-directed flange, a cage mounted on said partition-plate, the lower end of which surrounds said flange and is free to revolve thereon, a ball-valve located in said cage, and adapted to close said port or opening, said cage being supported at an angle to said port or opening, and provided on its inner inclined side with a weight, which operates to hold the cage so that the valve will roll to the bottom thereof, when the bottle is tilted or held sidewise, said cage being also provided with a central upwardly-directed rod, the upper end of which is pivotally supported, substantially as shown and described.

5. A bottle, or similar vessel, provided with a neck, having a partition-plate at the bottom thereof, in which is formed a central opening, around which is formed an upwardly-directed annular flange, a cage the lower end of which surrounds said flange and is free to revolve thereon, said cage being held at an angle thereto, a weight secured to the inner inclined side of said cage, a ball-valve located therein, and a central vertical rod also secured to said cage, said rod being pivotally supported at its upper end, and a tube secured in the neck, the lower end of which forms said pivotal support, and the upper end of which is closed, the side walls of said tube, and the upper end thereof, being also perforated, said tubular attachment being held in position by means of a cross-bar which passes therethrough, and the ends of which project into an annular groove formed in the inner walls of the neck of the bottle, said cross-bar being composed of sections, one of which is provided with a central bore at its inner end, and a spring located therein, and the other of which is provided with a shank which projects into said central bore, substantially as shown and described.

In testimony that I claim the foregoing as my invention I have signed my name, in presence of the subscribing witnesses, this 17th day of October, 1895.

WILLIAM MURRAY.

Witnesses:
C. GERST,
M. OPPENHEIMER.